(12) United States Patent
Hazzard et al.

(10) Patent No.: US 10,697,846 B2
(45) Date of Patent: Jun. 30, 2020

(54) CAPACITIVE LEAK AND FLAMMABLE VAPOR DETECTION SYSTEM

(71) Applicant: Ademco Inc., Golden Valley, MN (US)

(72) Inventors: Frederick Hazzard, Ham Lake, MN (US); Gregory Young, Blaine, MN (US); Ravindra Khosla, Maple Grove, MN (US); Paul Knauf, Eden Prairie, MN (US)

(73) Assignee: Ademco Inc., Golden Valley, MN (US)

( * ) Notice: Subject to any disclaimer, the term of this patent is extended or adjusted under 35 U.S.C. 154(b) by 13 days.

(21) Appl. No.: 15/971,478

(22) Filed: May 4, 2018

(65) Prior Publication Data
US 2019/0339152 A1 Nov. 7, 2019

(51) Int. Cl.
*G01M 3/16* (2006.01)
*G01N 27/60* (2006.01)
*F24H 9/20* (2006.01)

(52) U.S. Cl.
CPC ............ *G01M 3/16* (2013.01); *F24H 9/2007* (2013.01); *G01N 27/60* (2013.01)

(58) Field of Classification Search
None
See application file for complete search history.

(56) References Cited

U.S. PATENT DOCUMENTS

| 4,029,889 | A | * | 6/1977 | Mizuochi | G01M 3/045 |
| | | | | | 174/11 R |
| 4,713,603 | A | * | 12/1987 | Thorn | G01N 33/2823 |
| | | | | | 324/437 |
| 5,052,223 | A | * | 10/1991 | Regnault | G01F 23/263 |
| | | | | | 324/688 |
| 5,091,716 | A | * | 2/1992 | Nelson | G01M 3/2892 |
| | | | | | 200/82 E |

(Continued)

FOREIGN PATENT DOCUMENTS

WO 2006084263 A2 8/2006

OTHER PUBLICATIONS

"Measuring Capacitance & ESR," Meettechniek.info,https://meettechniek.info/passive/capacitance.html, pp. 1-6, Jan. 20, 2014.

(Continued)

*Primary Examiner* — Jas A Sanghera
(74) *Attorney, Agent, or Firm* — Shumaker & Sieffert, P.A.

(57) ABSTRACT

A single capacitive sensor that may detect both water leaks and flammable vapors. The sensor may have two electrodes not touching each other but supported with an insulative material between the electrodes that allows fluids to enter between the electrodes. An electronic circuit connected to the capacitive sensor may determine the capacitance of the two electrodes. Fluids may enter between the electrodes and affect their capacitance. Permittivities of the fluids may be calculated from their effects on capacitance. Ranges of the (Continued)

permittivities may indicate the kind of substances and their intensity of presence. Water and flammable vapors are examples of such substances. The electronic circuit may be connected to a control module of a water heater, in that if the intensity or concentration of detected water or flammable vapors reaches a pre-set threshold, then the circuit may trigger an alarm and/or shut down the water heater.

20 Claims, 6 Drawing Sheets

(56) References Cited

U.S. PATENT DOCUMENTS

| | | | |
|---|---|---|---|
| 5,159,276 A * | 10/1992 | Reddy, III | G01M 3/165 174/11 R |
| 6,725,705 B1 * | 4/2004 | Huebler | G01M 3/243 702/51 |
| 7,421,883 B2 | 9/2008 | Khadkikar et al. | |
| 9,638,653 B2 | 5/2017 | Potyrailo et al. | |
| 9,748,632 B2 | 8/2017 | Rokhsaz et al. | |
| 2006/0191323 A1 * | 8/2006 | Garabedian | F17D 5/06 73/40 |
| 2010/0235107 A1 * | 9/2010 | Fukumura | G01N 27/226 702/24 |
| 2016/0163177 A1 * | 6/2016 | Klicpera | E03B 7/071 137/59 |

OTHER PUBLICATIONS

Stofka, "Set LED's Hue From Red to Green," designideas, pp. 59-62, Oct. 21, 2010.

Blake et al., "Measuring Small Changes in Capacitive Sensors," Microchip, pp. 1-20, 2005.

Tomasz, "Use Analog Techniques to Measure Capacitance in Capacitive Sensors," Electronic Design, pp. 1-29, Nov. 13, 2012.

"Typical Capacitance Values for Possible Sensors," p. 1, Prior to May 4, 2018.

* cited by examiner $21 \longrightarrow \varepsilon_0 = 8.854 \dfrac{pF}{m}$ $22 \longrightarrow \varepsilon_r := 1$ $23 \longrightarrow \varepsilon_s := \varepsilon_0 \cdot \varepsilon_r$ $24 \longrightarrow \mu_0 = 1.257 \dfrac{\mu H}{m}$

28 → $C_W := \dfrac{\pi \cdot \varepsilon_S \cdot l_W}{\ln\left(\dfrac{d_W}{2 \cdot r_W} + \sqrt{\dfrac{d_W^{\,2}}{r_W^{\,2}} - 1}\right)} = 17\,pF$ 29 → $L_W := \dfrac{\mu_0 \cdot l_W}{\pi} \cdot \ln\left(\dfrac{d_W}{r_W} - \dfrac{d_W}{l_W} + \dfrac{1}{4}\right) = 1.266\,\mu H$

FIGURE 4

31 → $R_1 := 0.5 \cdot mm$

32 → $R_2 := 2 \cdot mm$

45 → $l_w = 1.5 m$

33 → $C_c := \dfrac{2 \pi \cdot \varepsilon_s \cdot l_w}{\ln\left(\dfrac{R_2}{R_1}\right)} = 60 pF$ 34 → $L_c := \dfrac{\mu_0 \cdot l_w}{2 \pi} \cdot \ln\left(\dfrac{R_2}{R_1}\right) = 0.416 \mu H$

FIGURE 5

35 → $l_p := l_w = 1.5\text{m}$

36 → $w_p := 2\text{cm}$

37 → $A_p := l_p \cdot w_p \qquad A_p = 300\,\text{cm}^2$

38 → $d_p := 0.25\text{mm}$

39 → $C_p := \dfrac{\varepsilon_s \cdot A_p}{d_p} = 1063\text{pF}$

40 → $L_p := \dfrac{\mu_0 \cdot d_p \cdot l_p}{w_p} = 0.024\,\mu\text{H}$

FIGURE 6

CAPACITIVE LEAK AND FLAMMABLE VAPOR DETECTION SYSTEM

BACKGROUND

The present disclosure pertains to detection and particularly to detection of leaks and vapors that can be hazardous.

SUMMARY

The disclosure reveals a single capacitive sensor that may detect both water leaks and flammable vapors. The sensor may have two electrodes not touching each other but supported with an insulative material between the electrodes. An electronic circuit connected to the capacitive sensor may determine the capacitance of the two electrodes. Liquid or gaseous materials (fluids) may enter between the electrodes and affect their capacitance. Permittivities of the substances may be calculated from their effects on capacitance. Ranges of the permittivities may indicate the kind of substances and their intensity of presence. Water and flammable vapors are examples of such substances. The electronic circuit may be connected to a control module of a water heater, in that if the intensity or concentration of detected water or flammable vapors reaches a pre-set threshold, then the circuit may shut down the water heater.

BRIEF DESCRIPTION OF THE DRAWING

FIG. 3 is a diagram of common parameters and equations relating to capacitance and inductance;

FIG. 4 is a diagram showing equations applicable to capacitance and inductance of a parallel two wire configuration;

FIG. 5 is a diagram showing equations applicable to capacitance and inductance of a two conductor coaxial cable configuration; and FIG. 6 is a diagram showing equations applicable to capacitance and inductance of a parallel two plate configuration.

DESCRIPTION

Figure 1:
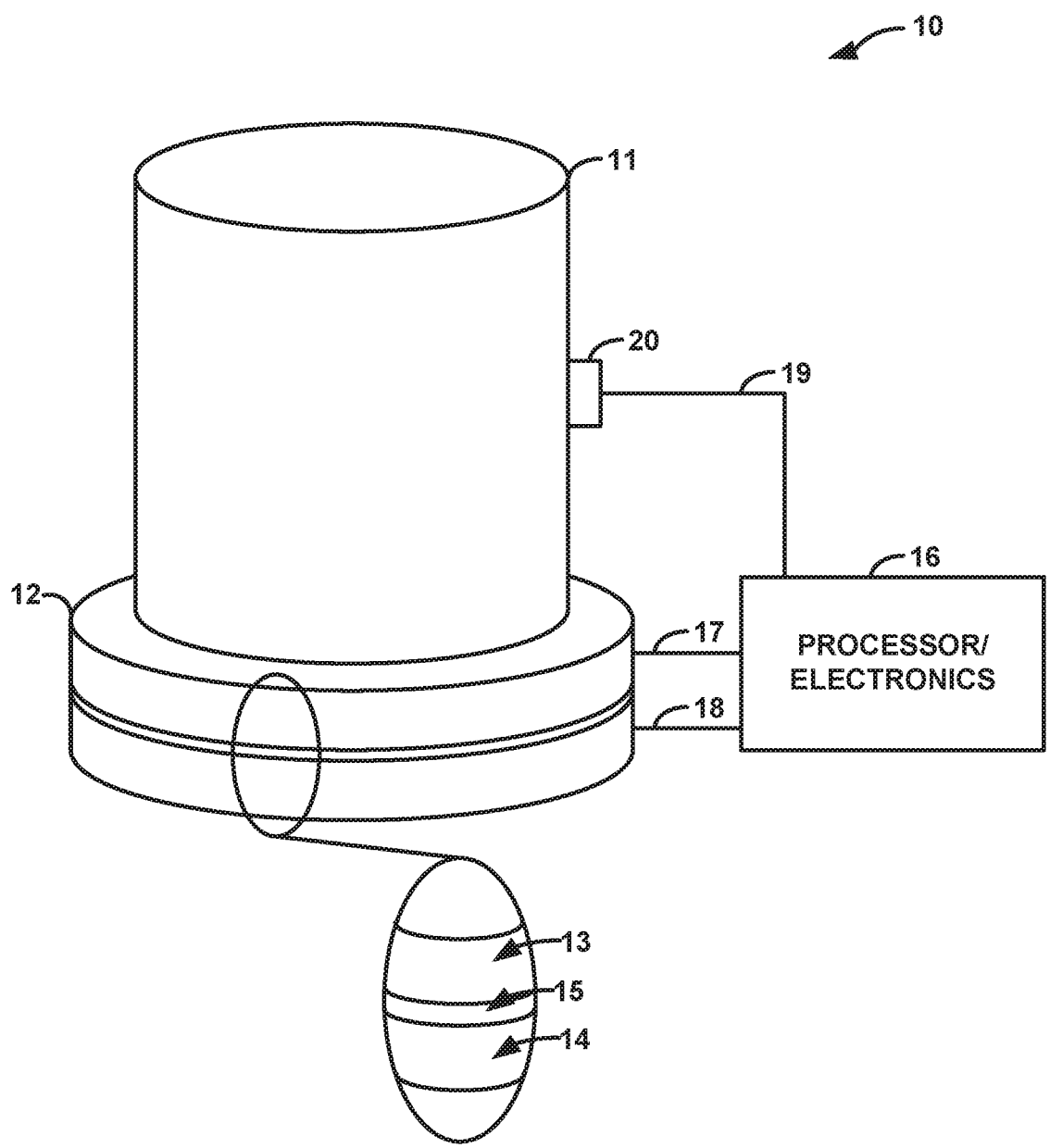
FIG. 1 is a diagram of the present capacitive detection system as applied to an illustrative example, such as a water heater.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Some natural gas and propane water heater controls may have options for flammable vapor sensors. Flammable vapors often are a safety concern for water heaters. The cost of such sensors may be a significant issue for the water heater (WH) original equipment manufacturers (OEMs) who may like to eliminate or reduce this cost while including this capability in more controls.

One approach to making a leak detector or sensor may be to use a capacitive sensor. A capacitive sensor may also be used to detect flammable vapors. The present approach may combine both sensors into one and distinguish between water leaks and flammable vapors. Since the water heater leak detector may be deployed to sense water around the entire outside diameter of the tank, the detector may also detect flammable vapors around the entire outside diameter of the tank instead of in just one location near the gas valve and burner assembly.

Capacitors may be made in many forms. Any type of capacitor may be used. The present approach is not necessarily limited to use of just the capacitors described here.

Capacitance depends on the permittivity of a dielectric material between two conductors. For free space, the permittivity is 8.854×10-12 F/m. For any other material, the permittivity may be expressed as a relative permittivity, so that the resulting permittivity is the product of the permittivity of free space and the relative permittivity. A key to this approach may be that the materials one wishes to detect have significantly different relative permittivities than air and the capacitance will change proportionately in the presence of those materials.

For this application key material relative permittivities include air-relative permittivity=1.05, flammable vapors-relative permittivity=1.7 to 2.5, and water-relative permittivity=40 to 80.

A total permittivity of the dielectric for the sensor may depend on how much of the material, such as water or flammable vapor, is present between the conductors. This may allow for the detection of flammable vapors in such a way that the concentration level of the flammable vapors could be determined so the water heater can be shut down above a selected threshold of the concentration levels that is determined to be unsafe, but could continue to operate at lower concentration levels. A large difference between the permittivities of flammable vapors and water may allow a detecting circuit to determine a difference between flammable vapors and water being in contact with the sensor elements, even if only approximately ten percent of the sensor elements is wet.

Forms of the sensor may incorporate (1) two parallel wires, (2) a coaxial cable, and (3) two parallel plates. Assuming no water or flammable vapors present, calculating the capacitance that would be expected from typical values of the equation parameters for the present sensor and for each of these forms, the capacitances may be (1) ~17 pF, (2) ~60 pF, and (3) ~1063 pF, respectively. Although the last form is easiest to measure, the others are in a range that is useful (see formulas for examples).

Various types of circuits that may be used to measure capacitance. One circuit that may be particularly useful for measuring the capacitance, especially for the cases of two parallel wires or a coax cable, would be a capacitance multiplier, which is an op-amp based circuit that effectively multiplies the capacitance by the gain of the op-amp circuit.

A circuit may need to take into consideration the inductance of the sensors when measuring capacitance. However, the relative permeability of air, water, and hydrocarbons may be approximately one. A change to the inductance that may occur is that if water completed an electric current path in the sensor, then the inductance would change because of the changed current path. Whether or not this change may happen would depend on the construction of the sensor. It may be a simple matter to construct the sensor so that it would or would not allow water to contact the conductors. Depending on a circuit measurement strategy, it may or may not be desirable for this to happen. If the inductance were to change when water came into contact with the sensor, it may be used to determine where along the sensor a leak was detected.

The circuitry needed to operate this sensor may be either integrated into the water heater control or be included in a separate module connected to the water heater control in various ways such as through a power connection, a communications port, a separate sensor connection, or otherwise. The sensor may have an IoT (Internet of Things) component or connection to a recipient that may record or provide some action in response to a signal. The recipient may be a cloud-based device or database. The sensor may be a hardware device with some embedded software measuring/detecting and transmitting data (e.g., temperature, water leak, or flammable vapor concentration detected).

FIG. 1 is a diagram of a configuration of the present detection system 10. The configuration indicated may use a water heater as an illustrative example for application of the detection system. A capacitor 12 may be placed around heater 11. A capacitor 12 configuration may involve parallel plates, parallel wires, or a coaxial cable. Capacitor 12 may be a set of parallel plates 13 and 14 with a spacer and/or dielectric 15 between the plates. The material, such as water or flammable vapor, may form a dielectric between the plates. Plates 13 and 14 may be connected to a processor or electronics 16 via connections 17 and 18, respectively. Processor 16 may have a connection 19 to a control module 20 of water heater 11. The capacitance and permittivity of the material as a dielectric 15 may be determined from electrical signals along connections by processor 16. Processor 16 may indicate the material, such as water or flammable vapors, as a dielectric and a magnitude of the material. If the material and its magnitude reach a predetermined or set threshold, which may show an issue or a problem, then the processor may send a signal along connection 19 to control module 20 to shut-down or lower a setting of water heater 11 to eliminate or minimize the issue or problem caused by the sensed presence of the material.

Figure 2C:
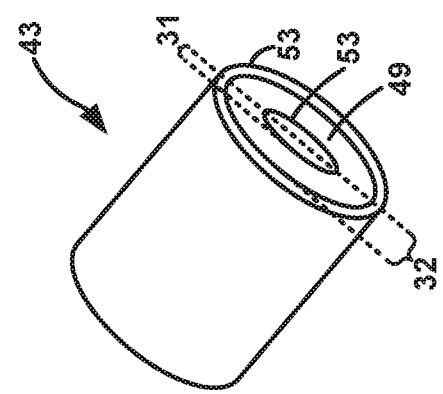
FIGS. 2a, 2b and 2c are diagrams of examples showing some illustrative configurations of capacitors used in the present detection system.
Figure 2B:
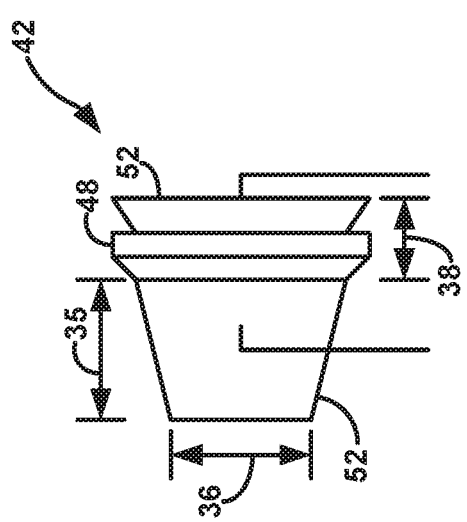
Figure 2A:
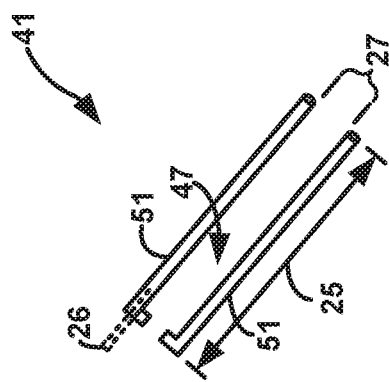

FIGS. 2a, 2b and 2c reveal some configurations of capacitors that may be used in the present detector system. Other configurations may be used in the system. FIG. 2a is a diagram of a two parallel wire configuration 41, with a length 25, wire radius 26 and separation 27 of the wires. Equations for configuration 41 are shown in FIG. 4. FIG. 2b is a diagram of a two parallel plate configuration 42, with a length 35, a width 36 and a distance 38 between the plates. Equations for configuration 42 are shown in FIG. 6. FIG. 2c is a diagram of a coaxial cable configuration 43, with an inner conductor radius 31, an inside radius 32 of an outer conductor, and a length 45. Equations for configuration 43 are shown in FIG. 5. Items 4 7, 48 and 49 of FIGS. 2a, 2b and 2c, respectively, are dielectric and or supportive spacers between the respective pairs of electrodes 51, 52 and 53. A spacing between the first and second electrodes may between 0.001 and 0.1 inch; however, other sizes of spacing may be used.

An alternate mechanism may be noted. In a three plate capacitive sensor, the construction of it may be like the one in FIG. 2b except that a third plate can be added between a first plate 52 and a fixed dielectric material may be located between the third plate and the first plate 52. This may allow the capacitance between the first plate 52 and the third plate to be used as a reference and the capacitance between plates 52 to be the sensor. Since the center plate is a conductor, the capacitance between a plate 52 and the third plate would be essentially zero and not considered. The change in relative capacitance between plates 52 versus the capacitance between a plate 52 and the third plate may be used to detect a water leak or flammable vapors. This may allow for a less sophisticated circuit to be used since only the relative change in capacitance needs to be detected rather than the actual change in capacitance value. This mechanism may also minimize temperature effects.

Another alternate mechanism may be noted. In a three wire capacitive sensor, its construction may be like that of FIG. 2a except that a third wire can be added and a fixed dielectric material may be located between one of wires 51 and the third wire. The three wires may be arranged in a flat configuration or in a triangular configuration when viewed from the end. The triangular configuration may offer the most functionality. Either arrangement may allow the capacitance between one of the wires and the third wire to be used as a reference. In the flat configuration, the capacitance between wires 51 may be used as the sensor. In the triangular configuration, the capacitance between wires 51 may be used as a sensor, but the capacitance between the one of the wires 51 and the third wire may also be used as a sensor, providing redundancy. Depending on the details of the construction, capacitance, inductance and/or conductance may be used for leak detection. Similar to the three plate mechanism, the three wire may allow for a less sophisticated circuit to be used since only the relative change in capacitance needs to be detected rather than the actual change in capacitance value and this mechanism would minimize temperature effects.

For the parallel plate configuration, even though the construction is discussed as generally being two plates, the construction may have any number of plates to increase the capacitance. The construction with any number of plates may be electrically the same as multiple capacitors connected in parallel, in which case a total capacitance would be the sum of capacitances for each set of plates. This may be different than the three plate alternative mechanism described above; however, it could be combined with that three plate alternative mechanism. The multiple plate version may have air or a spacer between each set of plates as is done with the first mechanism, or it could have air or a spacer between some of the plates and a fixed dielectric between other plates as is described in the a three plate alternate mechanism.

A practical use of the sensors may include measurement of inductance since many capacitive measurement approaches incorporate measuring the full impedance and calculating the resistive, capacitive, and inductive components of the impedance.

FIGS. 3-6 are diagrams that illustrate the capacitance principles used in the present detection system. FIG. 3 shows some of the terms used for calculating capacitances and inductances of a sensor. Symbol 21 represents permittivity of free space. Symbol 22 is a relative permittivity term. Symbol 23 represents permittivity of a material relative to free space. Symbol 24 represents the permeability of free space, which is approximately the same for air, water and hydrocarbons.

FIG. 4 is a diagram that shows an example calculation for two parallel wires having particular dimensions. Symbol 25 may indicate length of the wires. Symbol 26 may indicate a radius of the wires, and symbol 27 may indicate a distance of a separation of the wires. Equation 28 may be solved to get the capacitance between the wires. Equation 29 may be solved for the inductance of the wires.

FIG. 5 is a diagram that shows an example calculation for a coaxial cable. Symbol 31 may represent a radius of an inner conductor. Symbol 32 may represent an inside radius of an outer conductor. Equation 33 may be solved to get the capacitance of the coaxial cable. Equation 34 may be solved for the inductance of the coaxial cable.

FIG. 6 is a diagram that shows an example calculation for two parallel plates. Symbol 35 may represent a length of the plates, for example, around a water heater. Symbol 36 may represent a width of the plates. Equation 37 may represent an area of the plates. Equation 39 may be solved to obtain the capacitance of the plates. Equation 40 may be solved for the inductance of the plates.

In noting inductances, one may assume that current goes in opposite directions on the conductors. For water leak detection, an inductance value may depend on physically where the leak occurred on the sensor because the current path may change. For hydrocarbon detection, the inductance would not necessarily change since the hydrocarbons do not conduct.

To recap, a water leak and flammable vapor detector may incorporate first and second electrodes situated apart from each other; an insulative material situated between the first and second electrodes which allows fluid to enter between the electrodes and affect their capacitance; a circuit connected to the first and second electrodes that determines a first capacitance between the first and second electrodes when only air and the insulative material are between the electrodes, and a second capacitance when a fluid enters between the first and second electrodes; and a processor connected to the circuit.

The processor may convert the second capacitance of the first and second electrodes with a liquid or gaseous dielectric material into a permittivity. The processor may indicate from the permittivity that if the dielectric material entering between the first and second electrodes is water or flammable vapors, and if an amount of the water or the flammable vapors reaches or exceeds a pre-determined threshold indicating that a response to the presence of the water or flammable vapors is needed, then a signal is provided to one or more items of a group incorporating a control module connected to an appliance, and a recipient indicating that the response to the presence of water or flammable vapors is needed.

The appliance may be a water heater. The first and second electrodes may encircle the water heater at or very near the floor.

An output of the processor may be connected to the control module of the water heater. If the response to the presence of the water or flammable vapors is needed, then the processor may provide a signal to the control module to shut down the water heater.

A form of the first and second electrodes may be selected from a group incorporating first and second plates, first and second wires, and center and circumferential elements of a coaxial cable.

The processor may be connected to an IoT (Internet of Things) component. The IoT component may select one or more actions selected from a group incorporating alerting an end user and recording the occurrence in a cloud database.

An approach of capacitive detection of water and flammable vapors may incorporate placing a first electrode parallel to and at a pre-determined distance from a second electrode, placing an insulative spacer capable of allowing a fluid to enter between the first and second electrodes having a maximum thickness from each other equal to the pre-determined distance, and determining a first capacitance between the first and second electrodes when only air and the insulative material are between the electrodes. A fluid that enters and becomes a dielectric between the first and second electrodes may be identified upon the determining of a second capacitance of the first and second electrodes, and comparing the second capacitance with the first capacitance.

The first and second electrodes may be placed around a water heater for water leak detection and flammable vapor detection.

A circuit connected to the first and second electrodes may determine the capacitance of the first and second electrodes without and with a fluid between the first and second electrodes. A difference of the capacitances between the first and second electrodes with and without a fluid between the electrodes may indicate the presence of a fluid between the first and second electrodes.

A range of permittivities of a fluid between the first and second electrodes may be identified for each particular fluid being detected. Each range of permittivities may have a pre-determined threshold which if detected for a specific fluid results in one or more actions selected from a group incorporating a shut-down of a water heater, an alarm sounded, and an alarm sent through an Internet of Things (IoT) connection to a recipient.

If the fluid enters and comes in contact with the first and second electrodes, and an inductance of the first and second electrodes changes, then a change of the inductance may be used to determine where along the first and second electrodes a water leak has been detected.

The insulative spacer may be impermeable to water.

The insulative spacer may be porous.

A capacitive fluid sensor may incorporate a first electrode, a second electrode situated at a predetermined distance from the first electrode, an insulative material separating the first and second electrodes from each other at the predetermined distance, and a circuit connected to the first and second electrodes. The circuit may determine a capacitance between the first and second electrodes. An amount of capacitance may indicate whether there is a fluid between the first and second electors.

The insulative material may be porous and have a permittivity or relative permittivity similar to that of free space or air.

A form of the first and second electrodes may be selected from a group consisting of parallel plates, parallel wires and coaxial cable conductors.

The circuit may incorporate an operational amplifier having a resistive network that detects and multiplies the capacitance proportional to a gain of the circuit.

The circuit for the fluid sensor may derive a permittivity of a fluid from the capacitance determined by the fluid between the first and second electrodes. The permittivity may indicate whether the fluid between the first and a second electrodes is air, flammable vapors, water, or another fluid.

The first and second electrodes may be situated around an outside diameter of a tank of a water heater. The circuit may be connected to a control module of the water heater. If the circuit indicates a water leak or flammable vapors, then the water heater may be shut down, an alarm may be sounded, or an alarm may be sent through an internet of things (IoT) connection. If a predetermined threshold of capacitance of the first and second electrodes is achieved, then a permittivity range of water or flammable vapors may be revealed.

The capacitance of the first and second electrodes may indicate an amount of a specific fluid detected between the first and second electrodes for a particular range of permittivities. A pre-determined maximum and minimum permittivity may indicate a range threshold needed to trigger an action to be sent to a control device of a mechanism that can prevent damage due to presence of the specific fluid detected.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A water leak and flammable vapor detector device comprising:
    a first electrode;
    a second electrode situated apart from the first electrode;
    a third electrode located between the first electrode and the second electrode, wherein the third electrode comprises a conductive material;
    an insulative material situated between the first electrode and the second electrode which allows fluid to enter between the first electrode and the second electrode and affect a capacitance of the first electrode and the second electrode;
    a circuit connected to the first electrode and the second electrode, wherein the circuit is configured to:
        determine a change in a primary capacitance from a first primary capacitance value to a second primary capacitance value, wherein the primary capacitance represents the capacitance between the first electrode and the second electrode; and
        determine a secondary capacitance which represents a capacitance between the first electrode and the third electrode, wherein the circuit is configured to use the secondary capacitance as a reference to determine the change in the primary capacitance;
    and
    a processor connected to the circuit, wherein the processor is configured to:
    determine, based on a difference between the first primary capacitance value and the second primary capacitance value, a permittivity value;
    determine, based on the permittivity value, if an amount of water or flammable vapors reaches or exceeds a threshold amount of water or flammable vapors; and
    output, in response to the amount of water or flammable vapors exceeding the threshold amount of water or flammable vapors, a signal indicating that the amount of water or flammable vapors exceeds the threshold amount of water or flammable vapors.

2. The device of claim 1,
    wherein the first electrode, the second electrode, and the third electrode encircle a water heater.

3. The device of claim 2, wherein an output of the processor is electrically connected to a control module of the water heater, and
    wherein outputting the signal indicating that the amount of water or flammable vapors exceeds the threshold amount of water or flammable vapors causes the control module to shut down the water heater.

4. The device of claim 1, wherein the first electrode and the second electrode comprise at least one of a first plate and a second plate, a first wire and a second wire, and a center element of a coaxial cable and a circumferential element of a coaxial cable.

5. The device of claim 1, wherein the processor is electrically connected to an IoT (Internet of Things) component.

6. The device of claim 5, wherein the IoT component selects one or more actions from a group of actions comprising alerting an end user and recording an occurrence of the amount of water or flammable vapors exceeding the threshold amount of water or flammable vapors in a cloud database.

7. A method comprising:
    determining, using a circuit, a change in a primary capacitance from a first primary capacitance value to a second primary capacitance value, wherein the primary capacitance represents a capacitance between a first electrode connected to the circuit and a second electrode connected to the circuit, wherein an insulative material situated between the first electrode and the second electrode allows fluid to enter between the first electrode and the second electrode and affect the capacitance of the first electrode and the second electrode; and
    determining a secondary capacitance which represents a capacitance between the first electrode and a third electrode, wherein the circuit is configured to use the secondary capacitance as a reference for determining the change in the primary capacitance;
    determining, based on a difference between the first primary capacitance value and the second primary capacitance value, a permittivity value;
    determining, based on the permittivity value, if an amount of water or flammable vapors reaches or exceeds a threshold amount of water or flammable vapors; and
    outputting, in response to the amount of water or flammable vapors exceeding the threshold amount of water or flammable vapors, a signal indicating that the amount of water or flammable vapors exceeds the threshold amount of water or flammable vapors.

8. The method of claim 7, wherein the first electrode, the second electrode, and the third electrode encircle a water heater.

9. The method of claim 8, wherein in response to the fluid entering and coming in contact with the first electrode and the second electrode and an inductance of the first electrode and the second electrode changes, then a change of the inductance can be used to determine where along the first electrode and the second electrode a water leak exists.

10. The method of claim 7, wherein
    the circuit connected to the first electrode and the second electrode determines the primary capacitance value representing the capacitance between the first electrode and the second electrode,
    wherein the first primary capacitance value represents the capacitance between the first electrode and the second electrode without a fluid between the first electrode and the second electrode, and
    wherein the second primary capacitance value represents the capacitance between the first electrode and the second electrode with a fluid between the first electrode and the second electrode, and wherein determining the permittivity value comprises:

determining the permittivity of the fluid between the first electrode and the second electrode.

11. The method of claim 10, wherein a range of permittivities of the fluid between the first and second electrodes is identified, and
wherein the range of permittivities comprises a threshold which if detected for the fluid results in one or more actions selected from a group of actions comprising a shut-down of a water heater, an alarm sounded, and an alarm sent through an Internet of Things (IoT) connection to a recipient.

12. The method of claim 7, wherein the insulative material is impermeable to water.

13. The method of claim 7, wherein the insulative material is porous.

14. A capacitive fluid sensor device comprising:
a first electrode;
a second electrode situated apart from the first electrode;
a third electrode located between the first electrode and the second electrode, wherein the third electrode comprises a conductive material;
an insulative material situated between the first electrode and the second electrode; and
a circuit connected to the first electrode and the second electrode, wherein the circuit is configured to:
determine a change in a primary capacitance from a first primary capacitance value to a second primary capacitance value, wherein the primary capacitance represents the capacitance between the first electrode and the second electrode; and
determine a secondary capacitance which represents a capacitance between the first electrode and the third electrode, wherein the circuit is configured to use the secondary capacitance as a reference to determine the change in the primary capacitance,
wherein the change in primary capacitance indicates whether a fluid is present between the first electrode and the second electrode.

15. The device of claim 14, wherein the insulative material is porous and has a permittivity equal to a permittivity of free space or air.

16. The device of claim 14, wherein a the first electrode and the second electrode comprise at least one of a first plate and a second plate, a first wire and a second wire, and a center element of a coaxial cable and a circumferential element of a coaxial cable.

17. The device of claim 14, wherein the circuit comprises an operational amplifier having a resistive network that detects and multiplies the primary capacitance proportional to a gain of the circuit.

18. The device of claim 14, wherein the circuit is configured to:
determine, based on a difference between the first primary capacitance value and the second primary capacitance value, a permittivity value; and
determine, based on the permittivity value, whether the fluid between the the first electrode and the second electrode comprises flammable vapors, water, or another fluid.

19. The device of claim 18,
wherein the first electrode, the second electrode, and the third electrode encircle a water heater,
wherein the circuit is electrically connected to a control module of the water heater; and
if the circuit indicates a water leak or flammable vapors, then the water heater is shut down, an alarm is sounded, or an alarm is sent through an internet of things (IoT) connection; and
if a predetermined threshold of capacitance of the first and second electrodes is achieved then a permittivity range of water or flammable vapors is revealed.

20. The device of claim 14, wherein:
the capacitance of the first and second electrodes indicates an amount of a specific fluid detected between the first and second electrodes for a particular range of permittivities; and
a pre-determined maximum and minimum permittivity indicates a range threshold needed to trigger an action to be sent to a control device of a mechanism that can prevent damage due to presence of the specific fluid detected.

* * * * *